(12) United States Patent
Yun

(10) Patent No.: US 8,249,152 B2
(45) Date of Patent: Aug. 21, 2012

(54) VIDEO IMAGE SEGMENTATION

(75) Inventor: Il Dong Yun, Seongnam-si (KR)

(73) Assignee: Hankuk University of Foreign Studies Research and Industry-University Cooperation Foundation, Gyeonggi-do (KR)

( * ) Notice: Subject to any disclaimer, the term of this patent is extended or adjusted under 35 U.S.C. 154(b) by 1031 days.

(21) Appl. No.: 12/198,061

(22) Filed: Aug. 25, 2008

(65) Prior Publication Data

US 2010/0046605 A1 Feb. 25, 2010

(51) Int. Cl.
*H04N 7/12* (2006.01)
(52) U.S. Cl. .................................. 375/240.07
(58) Field of Classification Search ......................... None
See application file for complete search history.

(56) References Cited

U.S. PATENT DOCUMENTS

| | | | |
|---|---|---|---|
| 5,812,787 A * | 9/1998 | Astle | 375/240.25 |
| 6,941,024 B2 * | 9/2005 | Mukherjee | 375/240.19 |
| 7,436,887 B2 * | 10/2008 | Yeredor et al. | 375/240.01 |
| 7,653,130 B2 * | 1/2010 | Joyce et al. | 375/240.07 |
| 2004/0258154 A1 * | 12/2004 | Liu et al. | 375/240.16 |
| 2005/0286635 A1 * | 12/2005 | Kumar et al. | 375/240.16 |
| 2007/0248166 A1 * | 10/2007 | Chen et al. | 375/240.16 |
| 2008/0159385 A1 * | 7/2008 | Joyce et al. | 375/240.03 |
| 2008/0198931 A1 * | 8/2008 | Chappalli et al. | 375/240.16 |
| 2009/0147851 A1 * | 6/2009 | Klein Gunnewiek et al. | 375/240.16 |

OTHER PUBLICATIONS

Sun et al., "Background Cut", Leonardis et al. (Eds.): ECCV 2006, Part II, LNCS 3952, pp. 628-641 (2006).

* cited by examiner

*Primary Examiner* — Gregory Sefcheck
*Assistant Examiner* — Joshua Smith
(74) *Attorney, Agent, or Firm* — NSIP Law

(57) ABSTRACT

Techniques for segmenting an image of an object are provided. In some embodiments, an image segmentation apparatus includes an image input unit and an image processing unit. The image input unit is configured to receive as input a video image having a first image frame and a second image frame that is consecutive to the first image frame. The image processing unit is configured to segment the second image frame based at least in part on information on the first image frame.

15 Claims, 5 Drawing Sheets

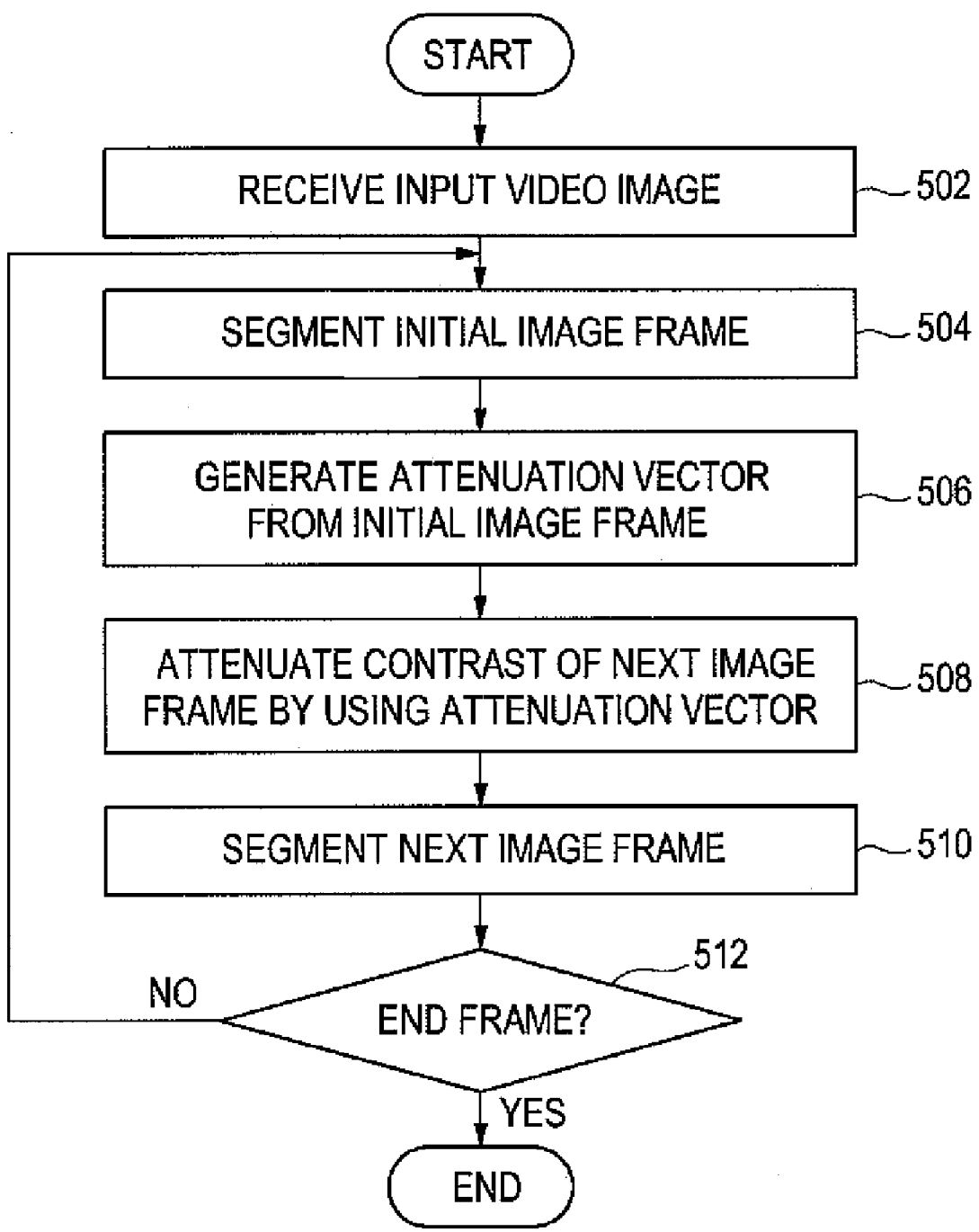

000
VIDEO IMAGE SEGMENTATION

TECHNICAL FIELD

The present disclosure relates generally to image segmentation technologies.

BACKGROUND

With the rapid increase in the use of digital videos, vigorous efforts are being made to develop more efficient techniques to extract material information from video data. Recently, the technique to extract a foreground layer of an image having a background and a foreground is being actively researched. The process of partitioning a digital image into multiple layers (e.g., a foreground and a background layer) is referred to as image segmentation, and the technique of extracting a foreground of an image is referred to as foreground segmentation. An example application of foreground segmentation is high quality live background substitution in a visual communication scenario, e.g., teleconferencing or instant messaging.

One of the high quality and real-time foreground layer extraction approaches may be known as so-called "background cut." One characteristic component of background cut approach is "background contrast attenuation" which may reduce foreground segmentation errors caused by high contrast edges in the clutter background. Background contrast attenuation may be based on the consideration that contrast from the background may be dissimilar to the contrast caused by the foreground/background boundary. Based on the above consideration, background cut obtains a background contrast map from an initial background image and attenuates the contrast corresponding to the background layer in a foreground-containing image by using the background contrast map, thereby making it relatively easier to extract a high quality foreground layer.

Background cut, however, may have some limitations. For example, background cut could improve upon the conventional techniques for images taken by a stationary camera with a known and still background. This is because the background cut may require an initial, stationary background image to attenuate the contrast in the background and accurately extract a foreground layer from the image. That is, the background cut may not be applied to video images where the background keeps changing (i.e., the camera is not stationery).

SUMMARY

Foreground segmentation techniques are provided. In one embodiment, by way of non-limiting example, an apparatus includes an image input unit configured to receive as input a video image having a first image frame and a second image frame that is consecutive to the first image frame, and an image processing unit configured to segment the second image frame based at least in part on information on the first image frame.

The Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 5 is a flow chart of an illustrative embodiment of a method for segmenting a foreground.

DETAILED DESCRIPTION

Figure 1:
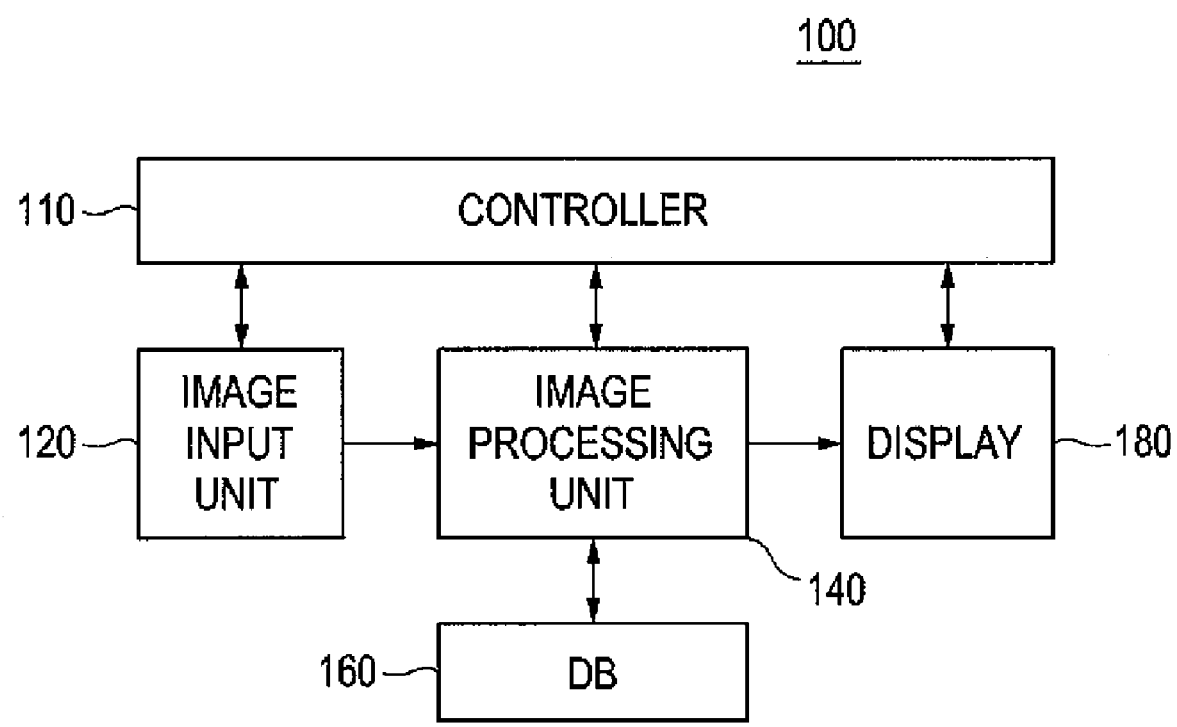
FIG. 1 shows a schematic block diagram of an illustrative embodiment of a video image segmentation apparatus.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the components of the present disclosure, as generally described herein, and illustrated in the Figures, may be arranged, substituted, combined, and designed in a wide variety of different configurations, all of which are explicitly contemplated and make part of this disclosure.

FIG. 1 shows a schematic block diagram of an illustrative embodiment of a video image segmentation apparatus 100. The video image segmentation apparatus 100 may include a controller 110, an image input unit 120, an image processing unit 140, a database (a DB 160) as a storage device, and a display 180. Each of the components 110, 120, 140, 160, and 180 may be provided as a single unit or device, or one or more units or devices, depending on the desired implementations. For example, the image processing unit 140 and the DB 160 may be implemented in a single integrated apparatus with the image input unit 120. Alternatively, the image processing unit 140 and the DB 160 may be implemented separately or remotely from the image input unit 120.

In one embodiment, the video image segmentation apparatus 100 may obtain the video image from the user through the input unit 120. The controller 110 controls the image processing unit 140 to receive the video image. Upon receiving the video image, the image processing unit 140 may perform the segmentation operation to the video image. The image processing unit 140 may remove background layers from the video image, and the controller 110 may configures the image processing unit 140 to deliver the background cut video image to the display 180. In selected embodiments, the video image segmentation apparatus 100 may be configured with a suitable operating system to install and run executable code, programs, etc., from one or more computer readable media, such as a floppy disk, CD-ROM, DVD, a detachable memory, a USB memory, a memory stick, a memory card or the like.

In some embodiments, the input unit 120 may provide a user with an interface to select a video image for input to the video image segmentation apparatus 100. For example, the image input unit 120 may include various types of input devices including, but not limited to, a keypad, a keyboard, a mouse, a touch pad, a touch screen, a pointing device, a trackball, a light pen, a joystick, a speech recognition device, a stylus device, an eye and head movement tracker, a digitizing tablet, a barcode reader, and the like, each of which may provide the user an interface to enter a desired input video image that has at least one frame of a stationery image.

In selected embodiments where the image processing unit 140 is installed on a remote device or server separate from the image input unit 120, the input video image may be transmitted from the image input unit 120 to the image processing unit 140 via a wired or wireless communication protocol. For example, a communication protocol (either wired or wireless) may be implemented by employing a digital interface protocol, such as a serial port, parallel port, PS/2 port, universal serial bus (USB) link firewire or IEEE 1394 link, or wireless interface connection, such as an infra-red interface, Blue-Tooth, ZigBee, high definition multimedia interface (HDMI), high-bandwidth digital contents projection (HDCP), wireless fidelity (Wi-Fi), or the like. Alternatively, the input video image may be transmitted to the image processing unit 140 through mobile communications systems such as the Global System for Mobile Communications (GSM), a Global Positioning System (GPS), Digital Mobile Multimedia (DMB), Code Division Multiple Access (CDMA), High-Speed Down Link Packet Access (HSDPA), Wi-Bro Wireless Broadband, and the like.

The image processing unit 140 may receive a video image and perform the segmentation operation to the video image. The video image includes one or more image frame that are recorded and displayed at a predetermined rate. During the segmentation operation to the video image, the image processing unit 140 may remove a background of each image frame and extract a foreground of each image frame. For example, the image processing unit 140 may determine the boundary from a previous frame of the video image and attenuate the contrast of a background layer from the current frame by using the information on the boundary of the previous frame. In some embodiments, the image processing unit 140 may estimate the contrast of the background in the current frame by using the known boundaries of the previous frame and attenuate the estimated background contrast based on a difference between the contrast for each pixel in the current frame and the contrast for pixel of the boundaries of the previous frame, thereby obtaining the background-attenuated frames (i.e., foreground-segmented frames) of the video image. In this way, the image processing unit 140 may remove background layers from the video image by recognizing that boundaries between foreground and background in video images do not tend to vary abruptly between consecutive frames. The image processing unit 140 may store the foreground-segmented frames of the video image into the DB 160, for example, for future usage. The controller 110 configures the image processing unit 140 to deliver the foreground-segmented frames of the video image to the display 180, for example, for the user's reference.

Figure 2:
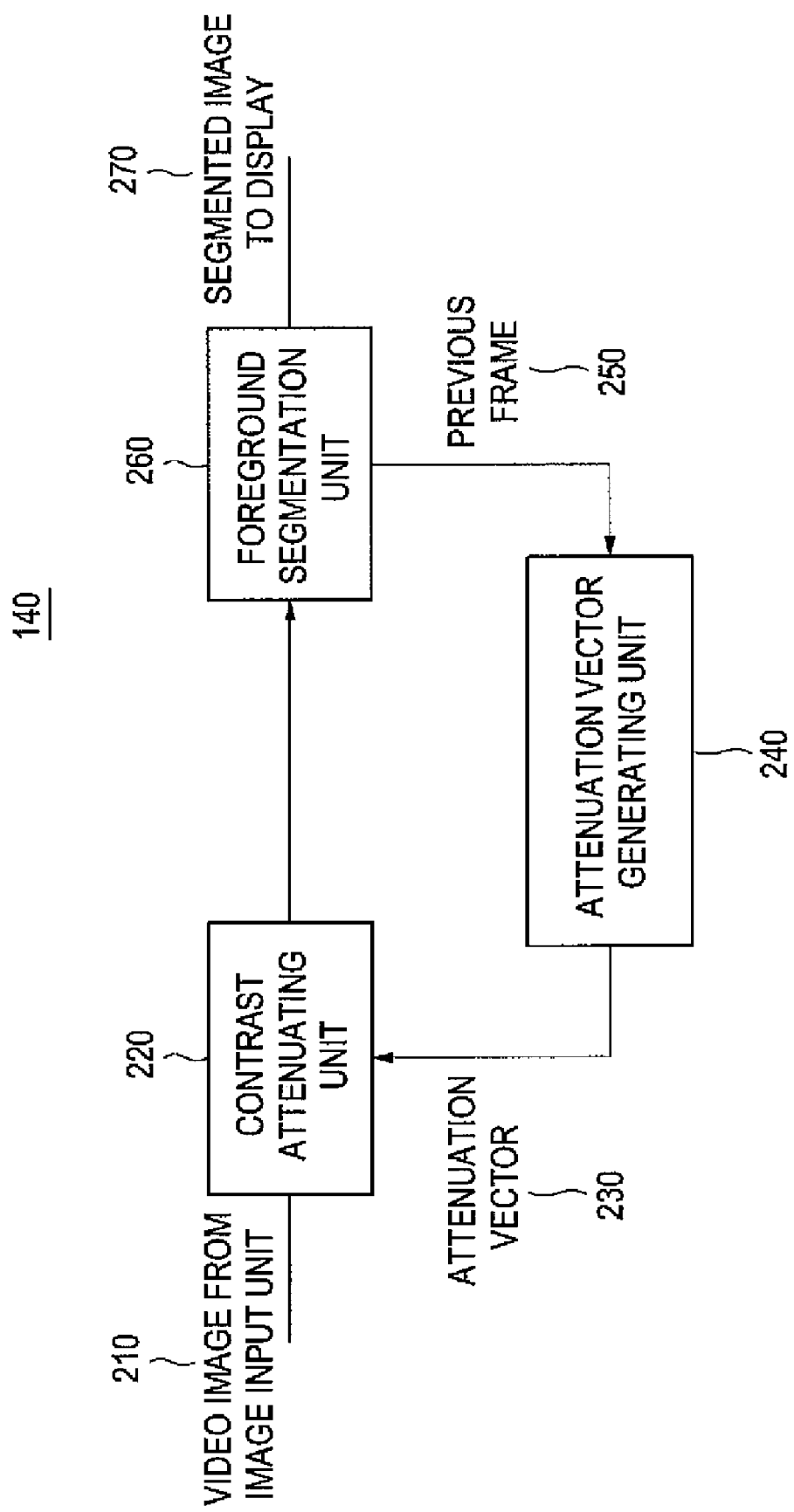
FIG. 2 shows a schematic block diagram of an illustrative embodiment of an image processing unit of the video image segmentation apparatus.

FIG. 2 shows a schematic block diagram of an illustrative embodiment of the image processing unit 140 of the video image segmentation apparatus 100. In some embodiments, the image processing unit 140 may include a contrast attenuating unit 220, an attenuation vector generating unit 240, and a foreground segmentation unit 260. As shown in FIG. 2, the contrast attenuating unit 220 receives a video image 210 from the image input unit 120. The video image 210 may include a series of still image frames each of which capture a moving object at a given time. The controller 110 configures the contrast attenuating unit 220 to deliver each image frame of the video image 210 to the foreground segmentation unit 260 sequentially. Upon receiving the image frames, the foreground segmentation unit 260 performs a segmentation operation to each of the image frames to extract a foreground of the image frame, thereby generating a foreground-segmented image frame. The controller 110 configures the foreground segmentation unit 260 to deliver the foreground-segmented image frame to the display 180 for a user's reference and to the attenuation vector generating unit 240 as a previous frame 250. The attenuation vector generating unit 240 generates an attenuation vector 230 based on the foreground-segmented previous frame 250. For example, the attenuation vector generating unit 240 may use the difference of contrasts one or more point on the boundary in the previous frame 250 and one of the pixels in the background of a next image frame of the video image 210. Alternatively, the attenuation vector generating unit 240 may use other vector generating techniques such as a gradient vector flow (GVF) to generate the attenuation vector 230. The controller 110 controls the attenuation vector generating unit 240 to deliver the attenuation vector 230 to the contrast attenuating unit 220. The contrast attenuating unit 220 attenuates the background of the next image frame based on the attenuation vector 230 to generate a background-attenuated image frame for the next image frame. The controller 110 controls the contrast attenuating unit 220 to deliver the background-attenuated image frame to the foreground segmentation unit 260. The foreground segmentation unit 260 performs a segmentation operation to the background-attenuated next image frame. In this way, the image processing unit 140 may obtain the foreground-segmented image frames for substantially all of the image frames contained in the video image 210.

In some embodiments, the contrast attenuating unit 220 may determine whether an image frame is the initial image frame of the video image 210. When the contrast attenuating unit 220 determines that the image frame of the received video image 210 is not the initial image frame, the contrast attenuating unit 220 performs a contrast attenuating operation by using the attenuation vector 230 that is obtained from the previous image frame 250. For example, the contrast attenuating unit 220 may subtract each component of the attenuation vector 230 obtained from the previous frame 250 from a corresponding pixel value of the initial frame (i.e., a current frame).

When the contrast attenuating unit 220 determines that the frame of the received video image 210 is the initial image frame, the controller 110 may control the contrast attenuating unit 220 to deliver the image frame to the foreground segmentation unit 260 without performing the contrast attenuation to the initial image frame. Alternatively, the contrast attenuating unit 220 may have an initial attenuation vector that can be applied to the initial image frame to perform the contrast attenuation to the initial image frame. For example, the video image 210 may include information on the initial attenuation vector so that the contrast attenuating unit 220 may use the initial attenuation vector to attenuate contrast to the initial image frame of the video image 210. The contrast attenuating unit 220 may use one of the basic attenuation vectors that can be previously stored in the DB 160.

The controller 110 controls the contrast attenuating unit 220 to deliver the image frame to the foreground segmentation unit 260. The foreground segmentation unit 260 performs a foreground segmentation operation to each of the image frames to detect the boundary between the foreground and the background of the image frame, thereby extracting the foreground from the image frame. In some embodiments, the foreground segmentation unit 260 may perform various numerical algorithms, including, but not limited to, a graph cut, a grab cut or the like. For example, the foreground segmentation unit 260 may perform a graph cut to each of the image frames to segment the image frame into the foreground and the background. The foreground segmentation unit 260 may segment the image frame by searching a boundary (so-called "cut") that minimize the cost function as given by:

$$E(A)=\lambda \cdot R(A)+B(A)$$

where $\lambda$ is a weighting factor, and $R(A)$ and $B(A)$ are referred to as a region term and a boundary term respectively which are given by:

$$R(A) = \sum_{p \in P} R_p(A_p)$$

$$B(A) = \sum_{\{p,q\} \in N} B_{\{p,q\}} \cdot \delta(A_p, A_q)$$

where P indicates an entire set of pixels in the image frame, p indicates a pixel, $A_p$ indicates a region label for the pixel p, $R_p(A_p)$ represents a cost when the pixel label at the pixel p is $A_p$, N indicates a set of pairs of adjacent pixels, $B_{\{p,q\}}$ represents a cost for the pairs of adjacent pixels and is determined by a function having a smaller cost for a larger contrast difference between p and q, and $\delta(A_p,A_q)$ indicates a delta function as given by $$\delta(A_p, A_q) = \begin{cases} 1 & \text{if } A_p \neq A_q \\ 0 & \text{otherwise.} \end{cases}$$

The foreground segmentation unit 260 extracts the foreground of the image frame to obtain the foreground-segmented image frame. In some embodiments, the image processing unit 140 may use the foreground-segmented image frame to make a new image frame having the segmented foreground overlapped with a new background. In this way, the image processing unit 140 may change the background (e.g., surroundings) for the segmented foreground (e.g., a person) in a real visual communication scenario such as teleconferencing, instant messaging or the like. The controller 110 may control the image processing unit 140 to deliver the foreground-segmented image frame to the display 160, e.g., for a users reference. In various embodiments where the display 180 is installed in a remote device separate from the image processing unit 140, the foreground segmented image frame may be transmitted to the display 180 by way of a wired or wireless communication protocol. In alternative embodiments, the image input unit 120 and the display 180 may be implemented in a single device having communication capability, such as a cellular phone, PDA, wireless terminal, or the like.

Figure 3A:
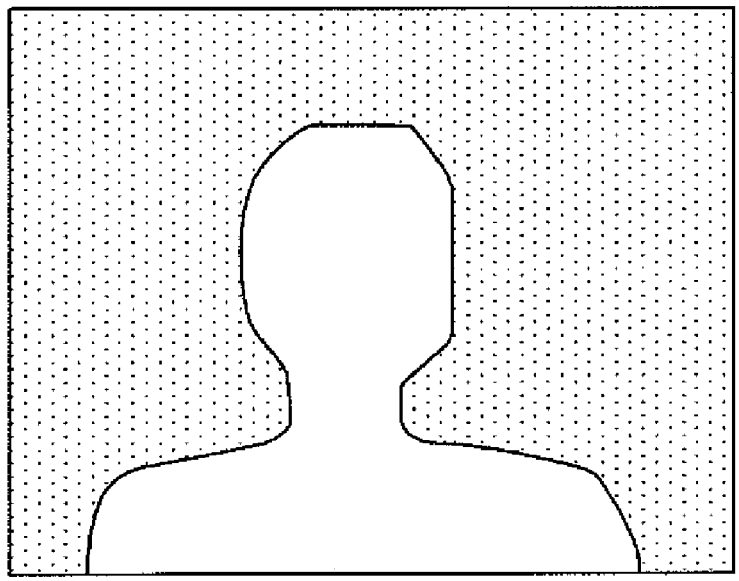
FIGS. 3A and 3B show a schematic diagram illustrating an example of boundaries between the foreground and the background in two consecutive frames of a video image in one embodiment.
Figure 3B:
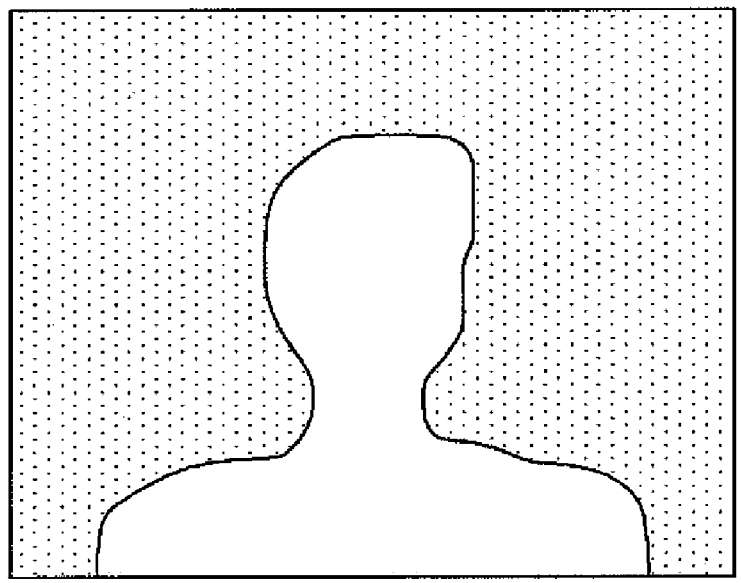

FIGS. 3A and 3B show a schematic diagram illustrating an example of boundaries between the foreground and the background in two consecutive frames [i.e., a current frame (FIG. 3A) and a previous frame (FIG. 3B)] of a video image. In order to remove background layers from an image frame of the video image 210, the foreground segmentation unit 260 may detect the boundary between the foreground and the background in the previous frame (FIG. 3B) so that the contrast attenuating unit 220 may utilize the boundaries from the previous frame to attenuate the contrast of a background layer from the current frame (FIG. 3A). Specifically the controller 110 controls the foreground segmentation unit 260 to deliver the foreground-segmented image frame (i.e., a previous frame 250) having the boundary between the foreground and the background in the previous frame 250 to the attenuation vector generating unit 240. The attenuation vector generating unit 240 generates the attenuation vector 230 from the boundary of the previous frame 250. In this way, the image processing unit 140 may utilize the boundaries from the previous frame 250 to attenuate the contrast of a background layer from the current frame based on the recognition that boundaries between foreground and background in video images do not tend to vary abruptly between consecutive frames, e.g., as shown in FIG. 3.

Figure 4:
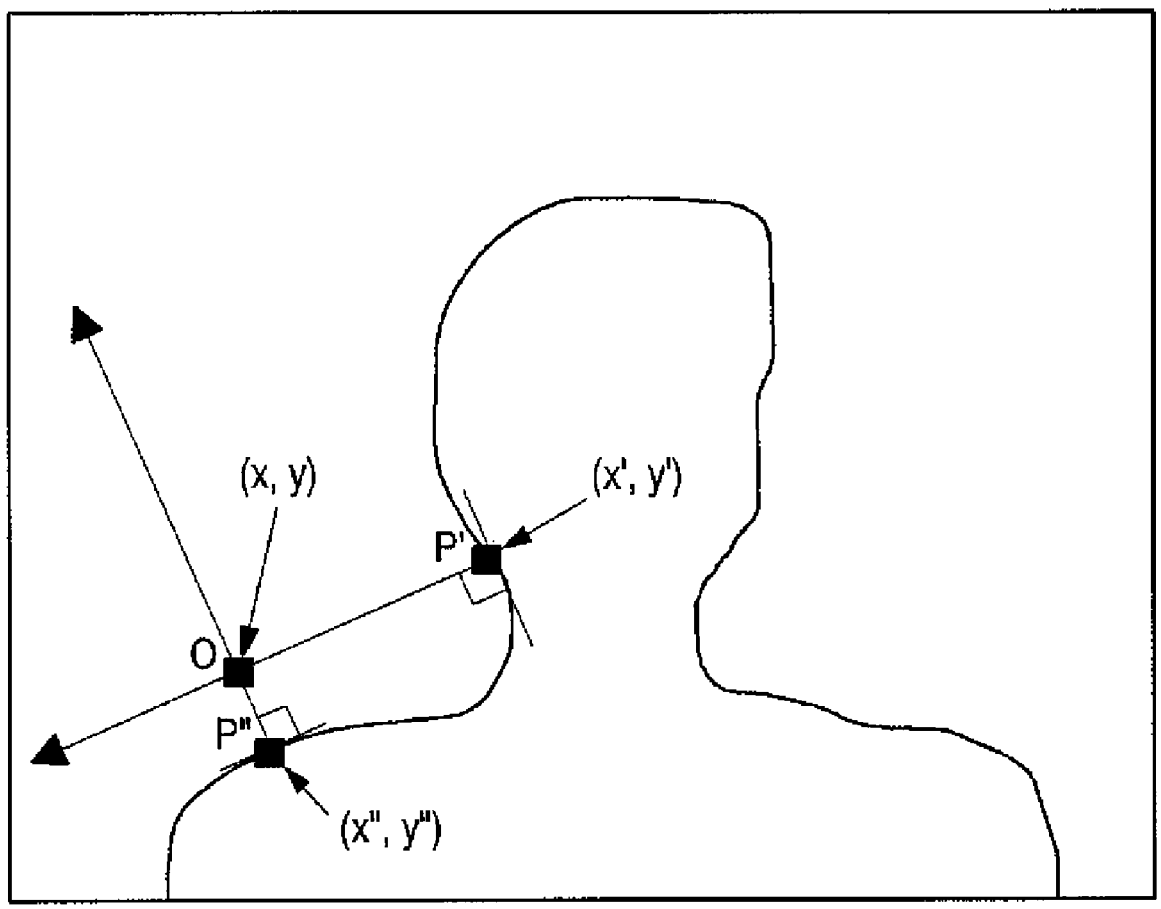
FIG. 4 shows a schematic diagram illustrating an application of a directional contrast attenuation of the background in one embodiment.

FIG. 4 shows a schematic diagram illustrating an application of a contrast attenuation of the background in one embodiment. For a frame of image having a known boundary (e.g., boundary of the previous frame 250) between a foreground and a background, e.g., as given by FIG. 3B, the attenuation vector generating unit 240 determines a pixel point O in the current frame that corresponds to an intersection of two lines each being substantially perpendicular to one of the tangential lines at different two points P' and P" on the boundaries of the previous frame 250. The attenuation vector generating unit 240 obtains an attenuation component at the pixel point O based on the distances from the two points P' and P" and the inner product of the contrast vectors, i.e., vectors OP' and OP". Similarly, the attenuation vector generating unit 240 may obtain attenuation components at different pixel points of the current frame that can be determined by an intersection of two substantially perpendicular lines which are the tangential lines to two different points on the boundaries of the previous frame 250. The attenuation vector generating unit 240 combines the attenuation components to generate the attenuation vector 230.

In some embodiments, the attenuation vector generating unit 240 may use other vector generating techniques such as a GVF technique to generate the attenuation vector 230. To implements the GVF technique, the attenuation vector generating unit 240 may define an attenuation vector field as given below:

$$v(x,y)=(u(x,y), v(x,y)),$$

where $u(x,y)$ and $v(x,y)$ are the contrast components the attenuation vector field $v(x,y)$ to the direction of x-axis and y-axis at the pixel $(x, y)$. To generate the attenuation vector 230, the attenuation vector generating unit 240 may perform a numerical algorithm to find out the attenuation vector field $v(x,y)$ that minimizes a cost equation as given below:

$$\epsilon = \iint \mu(u_x^2+u_y^2+v_x^2+v_y^2)+|\nabla f|^2|v-\nabla f|^2 dxdy$$

where $\nabla f$ represents a contrast in the image frame, $u_x$, $u_y$, $v_x$, $v_y$ indicate the partial differential values for $u(x,y)$ and $v(x,y)$ to the direction of x-axis and y-axis, and $\mu$ indicates a weighting factor. In some embodiments, the attenuation vector generating unit 240 may use a calculus of variation technique to search the optimum attenuation vector field $v(x,y)$ that minimizes the cost equation. The attenuation vector generating unit 240 determines the optimum attenuation vector field as the attenuation vector 230.

Referring back to FIG. 2, the contrast attenuating unit 220 receives the attenuation vector 230 to attenuate the contrast of the background in the current frame by using the attenuation vector 230 obtained from the previous frame 250. In some embodiments, the contrast attenuating unit 220 may represent the contrast by its gradients to the direction of x-axis and y-axis, $g_x(x,y)$ and $g_y(x,y)$, respectively, which are given as below:

$$g_x(x,y)=p(x,y)-p(x-1,y)$$

$$g_y(x,y)=p(x,y)-p(x,y-1)$$

where p(x,y) is a pixel value at a point (x,y). Accordingly, an orientation $C_o(x, y)$ and a magnitude $C_m(x, y)$ of the contrast can be given by:

$$C_o(x,y) = \arctan(g_y(x,y)/g_x(x,y))$$

$$C_m(x,y) = \sqrt{g_y^2(x,y) + g_x^2(x,y)}$$

where "arctan" means the inverse function of the tangent function. The contrast attenuating unit 220 may subtract the corresponding components of the attenuation vector 230 at a pixel point (x, y) from the contrast to the direction of x-axis and y-axis, $g_x(x,y)$ and $g_y(x,y)$. The controller 110 controls the contrast attenuating unit 220 to deliver the current image frame with the attenuated contrast to the foreground segmentation unit 260. In this way, the contrast attenuating unit 220 may attenuate the contrast from the current image frame so that the foreground segmentation unit 260 may minimize the undesirable contrast components in performing a foreground segmentation method such as a grab cut, a graph cut and the like.

FIG. 5 is a flow chart of an illustrative embodiment of a method for segmenting a foreground. At block 502, the video image segmentation apparatus 100 may receive a video image 210 from, for example, a user via image input unit 120. The image input unit 120 may include various input devices, such as a keypad, keyboard, mouse, or the like, to enter the input video image 210 into the video image segmentation apparatus 100. Optionally, the controller 110 may configure the image input unit 120 to transmit the input video image 210 to a remote system to process the input video image 210 at the remote system. In such a case, the input video image 210 may be entered into a portable device, such as a cellular phone, PDA, or the like, and then transmitted to the image processing unit 140 using a wireless or wired communication protocol. The image input unit 120 may transmit the input video image 210 to the image processing unit 140.

At block 504, the foreground segmentation unit 260 of the image processing unit 140 performs a foreground segmentation of an initial image frame of the received video image 210 to obtain an initial foreground segmented image frame (i.e., previous frame 250). In some embodiments, the foreground segmentation unit 260 may perform various numerical algorithms, including, but not limited to, a graph cut, a grab cut or the like as previously described. For example, the foreground segmentation unit 260 may perform a graph cut to image frames (including the initial image frame) to detect the boundary between the foreground and the background of the image frame, thereby extracting the foreground of the image frame. The foreground segmentation unit 260 may detect the boundary by searching a boundary (so-called "cut") that minimizes the cost function.

At block 506, the attenuation vector generating unit 240 generates the attenuation vector 230 based at least in part on the foreground segmented previous frame 250. For example, the attenuation vector generating unit 240 may use the difference of contrasts one or more point on the boundary in the previous frame 250 and one of the pixels in the background of a next image frame of the video image 210. In some embodiments, for a frame of image having a known boundary (e.g., boundary of the previous frame 250), e.g., as given by FIG. 3B, the attenuation vector generating unit 240 determines a pixel point O in the current frame that corresponds to an intersection of two lines each being perpendicular to one of the tangential lines at different two points P' and P" on the boundaries of the previous frame 250 as previously described.

At block 508, the contrast attenuating unit 220 receives the attenuation vector 230 to attenuate the contrast of the background in a next image frame (i.e., current frame) by using the attenuation vector 230 obtained from the initial image frame (the previous image frame). For example, the contrast attenuating unit 220 may subtract each component of the attenuation vector 230 obtained from the initial image frame 250 from a corresponding pixel value of the current image frame. The controller 110 controls the contrast attenuating unit 220 to deliver the current image frame with the attenuated contrast to the foreground segmentation unit 260. At 510, the foreground segmentation unit 260 performs a foreground segmentation of the current image frame in a similar manner as performed at operation 504 for the initial image frame. At decision block 512, the image processing unit 140 determines whether the current image frame is the end image frame in the video image 210 (i.e., whether the end image frame of the video image 210 is foreground segmented). If the current image frame is not the end image frame, the image processing unit 140 repeats blocks 506 to 510 for a new next image frame in the video image 210. That is, the controller 110 controls the foreground segmentation unit 260 to deliver the current image frame to the attenuation vector generating unit 240 as a new previous frame. The attenuation vector generating unit 240 generates an attenuation vector based on the new previous frame. The contrast attenuating unit 220 performs a contrast attenuation operation to the next image frame by using the new attenuation vector, and the foreground segmentation unit 260 performs a segmentation of the contrast attenuated next image frame. The image processing unit 140 repeats blocks 506 to 510 until the end of the video image 210. The controller 110 controls the image processing unit 140 to deliver the foreground segmented image frame to the display 160, e.g., for a users reference. Otherwise, if, at decision block 512, the current image frame is the end image frame, the image processing unit 140 finishes processing.

One skilled in the art will appreciate that, for this and other processes and methods disclosed herein, the functions performed in the processes and methods may be implemented in differing order. Furthermore, the outlined steps and operations are only provided as examples, and some of the operations may be optional, combined into fewer operations, or expanded into additional operations without detracting from the spirit and scope of the disclosed embodiments.

In light of the present disclosure, those skilled in the art will appreciate that the systems, apparatus, and methods described herein may be implemented in hardware, software, firmware, middleware, or combinations thereof and utilized in systems, subsystems, components, or sub-components thereof. For example, a method implemented in software may include computer code to perform the operations of the method. This computer code may be stored in a machine-readable medium, such as a processor-readable medium or a computer program product, or transmitted as a computer data signal embodied in a carrier wave, or a signal modulated by a carrier, over a transmission medium or communication link. The machine-readable medium or processor-readable medium may include any medium capable of storing or transferring information in a form readable and executable by a machine (e.g., by a processor, a computer, etc.).

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. An apparatus comprising:
an image input unit configured to receive as input a video image having a first image frame and a second image frame, the second image frame being consecutive to the first image frame; and
an image processing unit configured to segment the second image frame based at least in part on information on the first image frame,
wherein the image processing unit comprises a foreground segmentation unit configured to segment the first image frame to determine a boundary between a foreground and a background of the first image frame, an attenuation vector generating unit configured to generate an attenuation vector from the segmented first image frame, and a contrast attenuating unit configured to attenuate a contrast of the second image frame by using the attenuation vector, and
the attenuation vector generating unit is configured to generate the attenuation vector based on a difference between the contrast for a pixel in the second image frame and the contrast for a pixel of the boundary of the first image frame,
the attenuation vector generating unit is configured to measure a difference between a contrast at a pixel of the second image frame and a contrast at a certain point of the boundary of the first image frame to generate a component of the attenuation vector, and
the attenuation vector generating unit is configured to measure distances between the pixel of the second image frame and two different points of the boundary, and generates the component of the attenuation vector according to the distances and the inner product of components of the contrast at the pixel of the second image frame.

2. The apparatus of claim 1, further comprising a display configured to display the segmented second image frame.

3. The apparatus of claim 1, wherein the foreground segmentation unit is configured to segment the second image frame.

4. The apparatus of claim 1, wherein the attenuation vector generating unit calculates a Gradient Vector Flow (GVF) from the boundary.

5. The apparatus of claim 1, wherein the foreground segmentation unit applies a segmentation technique to segment the first image frame into a foreground and a background.

6. The apparatus of claim 5, wherein the segmentation technique includes a graph cut and a grab cut methods.

7. The apparatus of claim 1, wherein the apparatus is a portable device.

8. The apparatus of claim 7, wherein the apparatus is a cellular phone.

9. A method comprising:
receiving a video image having a first image frame and a second image frame, the second image frame being consecutive to the first image frame; and
processing the video image to segment the second image frame based at least in part on information on the first image frame,
wherein processing the video image comprises segmenting the first image frame to determine a boundary between a foreground and a background of the first image frame, generating an attenuation vector from the segmented first image frame, and attenuating the contrast of the second image frame by using the attenuation vector,
the attenuation vector is generated based on a difference between the contrast for a pixel in the second image frame and the contrast for a pixel of the boundary of the first image frame,
the generating an attenuation vector includes measuring a difference between a contrast at a pixel of the second image frame and a contrast at a certain point of the boundary of the first image frame to generate the component of the attenuation vector, and
the generating an attenuation vector includes measuring distances between the pixel of the second image frame and two different points of the boundary, and generating the component of the attenuation vector according to the distances and the inner product of components of the contrast at the pixel of the second image frame.

10. The method of claim 9, further comprising displaying the segmented second image frame.

11. The method of claim 9, wherein processing the video image further comprises segmenting the second image frame.

12. The method of claim 9, wherein generating an attenuation vector includes calculating a Gradient Vector Flow (GVF) from the boundary to generate an attenuation vector map.

13. The method of claim 11, wherein segmenting the first image frame and segmenting the second image frame include applying a segmentation technique to segment the first image frame and the second image frame into a foreground and a background respectively.

14. The method of claim 13, wherein the segmentation technique includes a graph cut and a grab cut methods.

15. A non-transitory computer-readable storage medium having stored thereon computer instructions that, when executed by a computer, cause the computer to perform a method comprising:
receiving a video image having a first image frame and a second image frame, the second image frame being consecutive to the first image frame; and
processing the video image to segment the second image frame based on information on the first image frame,
wherein processing the video image comprises segmenting the first image frame to determine a boundary between a foreground and a background of the first image frame, generating an attenuation vector from the segmented first image frame, and attenuating the contrast of the second image frame by using the attenuation vector,
the attenuation vector is generated based on a difference between the contrast for a pixel in the second image frame and the contrast for a pixel of the boundary of the first image frame,
the generating an attenuation vector includes measuring a difference between a contrast at a pixel of the second image frame and a contrast at a certain point of the boundary of the first image frame to generate the component of the attenuation vector, and
the generating an attenuation vector includes measuring distances between the pixel of the second image frame and two different points of the boundary, and generating the component of the attenuation vector according to the distances and the inner product of components of the contrast at the pixel of the second image frame.

* * * * *